Oct. 25, 1966 G. E. FAHERTY, SR 3,281,139
LEAF SPRING AND PROCESS OF MAKING SAME
Filed Jan. 4, 1965
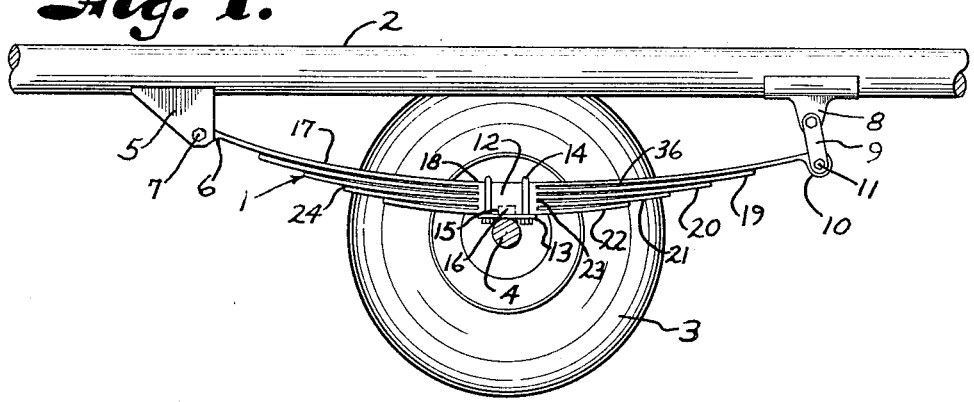
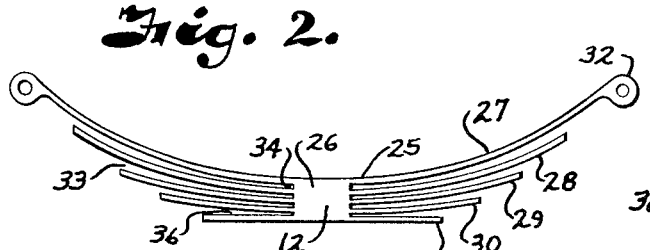
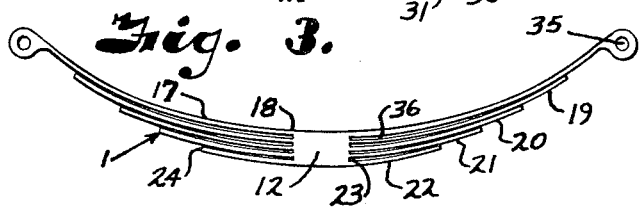
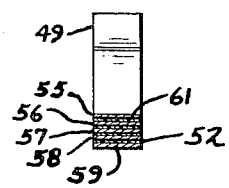
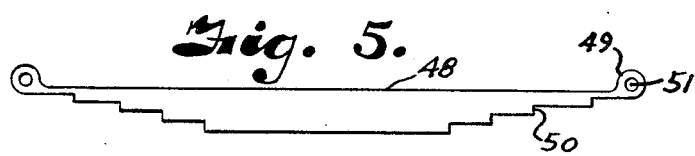
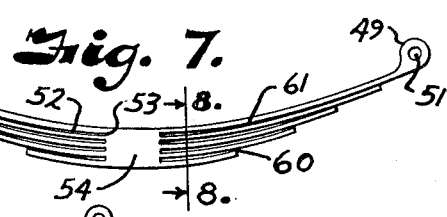
INVENTOR.
GEORGE E. FAHERTY, SR.
BY Fishburn and Gold
ATTORNEYS

United States Patent Office 3,281,139
Patented Oct. 25, 1966

3,281,139
LEAF SPRING AND PROCESS OF MAKING SAME
George E. Faherty, Sr., 2416 Brush Creek Blvd., Kansas City, Mo.
Filed Jan. 4, 1965, Ser. No. 422,885
8 Claims. (Cl. 267—47)

This invention relates to leaf springs and the process of making same, and more particularly to such springs wherein there is a spring nest with a plurality of superimposed spring elements extending from a common connection and generally in the form of elliptical or cantilever type.

The principal objects of the present invention are to provide an elongate leaf spring member having a portion for connection to a support and a plurality of superimposed spring leaves integral with and extending therefrom and terminating in an end portion adapted to be connected to a load; to provide a process for making a multiple leaf spring structure consisting of forming a one-piece spring structure having a solid base member with a plurality of spaced apart elongate leaves extending therefrom, then compressing said member to reduce the spacing between the leaves and move same to a superimposed relationship, arching the spring member, effecting contact of the outer end portions of the leaves with the next adjacent leaf and heat treating and tempering the leaves of the spring to provide a resilient structure; to provide a leaf spring structure having a solid base structure and a plurality of elongate integral leaves extending therefrom in superimposed relation with a main leaf having a load connection on the free end and the other leaves being progressively shorter in length with the free end portions of a leaf contacting the next adjacent longer leaf; to provide such a spring wherein the leaves extend from the solid base on a curve and form a unitary structure in a leaf spring of the cantilever type; to provide such a structure wherein the spring leaves extend symmetrically opposite from the solid base and are curved in an elliptical type spring member; to provide such a spring structure wherein the spring leaves are spaced apart adjacent the solid base and each of the shorter leaves have their free end portions substantially contacting the next adjacent leaf in the superimposed nest; to provide such a structure with a wear-resistant resilient filler in the spaces between the leaves; and to provide a spring structure and process of making same that is economical and wherein the spring structure is unitary, eliminating relative movement in the leaf members and also facilitating mounting and handling of the structure.

Other objects and advantages of this invention will become apparent from the following description taken in connection with the accompanying drawings wherein are set forth by way of illustration and example certain embodiments of this invention.

FIG. 1 is a sectional view through a vehicle frame to which is applied an elliptical spring suspension incorporating a spring embodying the invention.

FIG. 2 is a side elevation of a multiple leaf structure prior to shaping and forming.

FIG. 3 is a side elevation of the multiple leaf structure after compressing and forming of the leaves into the shape of an elliptical spring.

FIG. 4 is a spring structure embodying the invention in the form of a cantilever type.

FIG. 5 is a side elevation of the modified form of blank for the making of an elliptical spring.

FIG. 6 is a side elevation of the blank of FIG. 5 after slotting to form the spaced apart leaves.

FIG. 7 is a side elevation of the modified form after arching into elliptical form.

FIG. 8 is a transverse sectional view through the spring taken on the line 8—8, FIG. 7.

Referring more in detail to the drawings:

The reference numeral 1 generally designates a spring structure embodying the features of the present invention and shown in FIG. 1 in an ordinary spring suspension such as is adapted for small trailers and the like. The numeral 2 designates the side member of a trailer rollingly supported by wheels 3 mounted on an axle 4. Forwardly of the axle 4, the side member 2 has depending brackets 5 to which is pivotally connected an eye 6 of the spring structure 1 by means of a bolt 7 as in conventional practice. Rearwardly of the axle 4, the side member 2 has a depending bracket 8 mounting a rear shackle 9 to which is pivotally mounted an eye 10 of the spring structure by a shackle bolt 11. The mid-portion or base 12 of the spring is suitably secured to the axle 4. In the structure illustrated, the axle has a spring pad or seat member 13 engaged by said spring base which is secured thereto by suitable fastening devices such as U-bolts 14. It is preferred that the base 12 be solid and it have a recess 15 extending therein for receiving an upstanding projection 16 on the pad 13 to hold the spring from moving longitudinally or transversely relative to the pad or seat 13. It is to be understood, however, that the recess may be an aperture extending through the spring for receiving a bolt or other fastening devices as said base member is solid and of a size to provide ample strength wherein the aperture will not weaken or endanger the hardened spring leaves or structure.

The spring structure includes an elongate main leaf portion 17 extending symmetrically oppositely from ends 18 of the base member 12 with the ends of the main leaf member terminating in the eyes 6 and 10. It is preferred that the main leaf member be of substantially uniform width and thickness throughout its length substantially from the base member 12 to the eyes at the respective ends. The spring structure 1 consists of a nest of a plurality of elongate flat leaves arranged in superimposed relation and extending substantially symmetrically from the opposite ends 18 of the base member. Each of the leaves are integral with the base member, and it is preferred that the leaves other than the main leaf be progressively shorter in length than said main leaf and, in the illustrated structure, the leaves 19, 20, 21 and 22 respectively are progressively shorter. Also, the adjacent leaves are slightly spaced apart as at 23 adjacent the base member. The main leaf 17 is arched and each of the shorter leaves have additional arch or curvature whereby the outer end portions of the shorter leaves substantially engage the adjacent longer leaf as at 24. With this arrangement of the spring, the structure is such that the eyes or base member may be connected to a support and the other connected to a load and, in the illustrated structure, the base member 12 is mounted on the supporting axle and the eyes 6 and 10 are connected to the load whereby the leaves cooperate to provide cantilevered support between the base member and load. An increased load tends to straighten the main leaf member 17 and, through the engagement of the progressively shorter leaf members, the pressure imposed by each is increased, and also they are straightened to provide additional resistance to support the load.

The integral base member and leaves is adapted to be formed of suitable metal capable of being made to have a spring action. The structure is particularly adapted to be cast, extruded or otherwise formed from suitable metal such as steel, aluminum or other material capable of spring action, and then worked and heat treated to form the spring structure illustrated in FIG. 1, as for example, a blank 25 may be cast of suitable metal with the base portion 26 having a main leaf 27 and other leaves 28, 29, 30 and 31 extending from and integral with said base portion. The blank 25 is also adapted to be extruded and then cut to the desired width of leaves. The free end portions of the main leaf 27 have enlarged portions 32 to form eyes. It is preferred that the leaf members be spaced apart and that they have different curvature whereby the spacing between said leaves at the outer end portions as at 33 is greater and becomes progressively less to a narrow point as at 34 adjacent the base portion 26 in order that the spacers in the mold between the leaves will have adequate strength. It is preferred that the surfaces of the leaves be suitably cleaned and/or smoothed, and that the blank be subjected to pressure compressing the base portion and leaves toward one another to reduce the spacing between the leaves adjacent said base portion 26 and also to form the spring structure to provide an arch to the leaves as desired with the free ends of the shorter leaves contacting the adjacent leaf, as illustrated in FIGURE 3. Bores 35 are formed or reamed in the enlarged portions 32 to form the respective eyes at the ends of the main leaf. The structure is then subjected to suitable heat treatment and tempering whereby the spring structure will retain its shape and have suitable resiliency. A suitable wear-resistant filler 36 may be inserted in the spacing between the adjacent leaves to reduce wear.

In the structure illustrated in FIG. 4, the spring member 37 is of the cantilever type which is generally substantially one-half of the elliptical type spring, the cantilever type spring having a base portion 38 adapted to be secured by suitable fastening devices to a support with a main leaf 39 and progressively smaller leaves 40, 41, 42 and 43 integral with said base member and extending therefrom in superimposed relation, the main spring leaf terminating in an eye 44 or other suitable structure for connection to a load. The cantilever type spring may be formed in the same manner as described relative to the spring shown in FIGS. 1 to 3 inclusive with small spacing 45 between the adjacent leaves at the base member with said leaves being curved whereby at the free ends the shorter leaves contact the longer leaves as at 46. A wear-resistant resilient filler 47 such as rubber or synthetic resin may be placed in the spaces 45 between the leaves to have the effect of a lubricant particularly where the material of the spring leaves has an abrading action one on the other under high pressures.

In the form of the invention illustrated in FIGS. 5 to 8 inclusive, a metal blank 48 is formed by casting, extruding, forging or the like and preferably shaped to have enlarged portions 49 on the ends and a stepped arrangement as at 50 to provide progressively thicker and shorter portions toward the center. The enlarged portions 49 are provided with bores 51 to form eyes and the blank is machined to provide substantially parallel slots 52 extending from the outer ends of the steps 50 and terminating as at 53 to leave a solid base member or portion 54 as the central portion. The slots 52 are preferably all parallel so as to define a main leaf 55 and progressively shorter leaves 56, 57, 58 and 59. The structure is then subjected to compressive pressure and forming to provide an arch in the spring, as illustrated in FIG. 7, and also to curve the smaller leaves whereby the free ends of the shorter leaves contact the adjacent longer leaves as at 60. The structure is then heat treated and tempered to provide the desired resiliency in the leaves, and a suitable filler of wear-resistant resilient material 61 such as rubber or suitable plastic is placed in the spaces between the leaves to reduce wear in the contacting portions thereof. The spring member is then ready to be assembled into a mounting, as for example, a trailer or the like wherein the spring is between a support member and a load.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A leaf spring structure comprising,
   (a) a solid bass member,
   (b) a plurality of flat spring leaves integral with said base member and extending therefrom in superimposed relation,
   (c) said leaves being spaced one from the other adjacent said base member with a free end of each of the leaves substantially contacting the next adjacent leaf,
   (d) and a connector means on one of the leaves at the free end thereof for connection to a load.

2. A leaf spring structure comprising,
   (a) a solid base member adapted to be mounted on a support,
   (b) a plurality of flat spring leaves of different lengths integral with said base member and extending therefrom in superimposed relation,
   (c) said leaves being spaced one from the other adjacent said base member with a free end of the shorter leaves in contact with the next adjacent longer leaf,
   (d) and a connector means on the longest leaf at the free end thereof for connection to a load whereby the spring forms a cantilevered support between the support and load.

3. An elliptical leaf spring structure as set forth in claim 2 wherein the spring leaves extend symmetrically from opposite ends of the solid base member.

4. A leaf spring structure comprising,
   (a) a solid base member adapted to be mounted on a support,
   (b) a plurality of flat spring leaves of different lengths integral with said base member and extending therefrom in superimposed relation,
   (c) said leaves being spaced one from the other adjacent said base member with a free end of the shorter leaves in contact with the next adjacent longer leaf,
   (d) and a connector means on the longest leaf at the free end thereof for connection to a load,
   (e) said spring leaves all being arched from the solid base member to the respective free ends of said leaves.

5. A leaf spring structure comprising,
   (a) a solid base member adapted to be mounted on a support,
   (b) a plurality of flat spring leaves of different lengths integral with said base member and extending therefrom in superimposed relation, the longer leaf being a main leaf and the other leaves being progressively shorter,
   (c) said leaves being spaced one from the other adjacent said base member with a free end of the shorter leaves substantially contacting the next adjacent longer leaf,
   (d) connector means on the main leaf at the free end thereof for connection to a load,
   (e) said spring leaves all being arched from the solid base member to the respective free ends of said leaves,
   (f) and a wear-resistant filler in the space between adjacent leaves.

6. An elliptical leaf spring comprising,
   (a) a solid base member having opposite ends,
   (b) a plurality of flat spring arcuate leaves integral with said base member and extending symmetrically from opposite ends thereof and forming opposed cantilevered support members between the base member and a load, (c) and means on the free end of one of said leaves remote from said base member for engagement with said load, (d) the other spring leaves having free end portions substantially contacting the next adjacent leaf, (e) said leaves being spaced one from the other adjacent said base member.

7. An elliptical leaf spring comprising, (a) a solid base member having opposite ends, (b) a plurality of flat spring arcuate leaves integral with said base member and extending symmetrically from opposite ends thereof and forming opposed cantilevered support members between the base member and a load, (c) and a connector means on the free end of one of said leaves remote from said base member for connection to said load, (d) the other spring leaves progressively shorter in length than said one leaf having the connector means with the free end portion of a leaf contacting the next adjacent longer leaf, (e) said leaves being spaced one from the other adjacent said base member.

8. An elliptical leaf spring comprising, (a) a solid base member having opposite ends, (b) a plurality of flat spring arcuate leaves integral with said base member and extending symmetrically from opposite ends thereof and forming opposed cantilevered support members between the base member and a load, (c) a connector means on the free end of one of said leaves remote from said base member for connection to said load, (d) the other spring leaves being progressively shorter in length than said one leaf having the connector means with the free end portion of a leaf contacting the next adjacent longer leaf, (e) said leaves being spaced one from the other adjacent said base member, (f) and a wear-resistant resilient filler in said spaces between said leaves.

No references cited.

ARTHUR L. LA POINT, *Primary Examiner.*

R. M. WOHLFARTH, *Assistant Examiner.*